(12) United States Patent
Jaradi et al.

(10) Patent No.: US 10,065,592 B2
(45) Date of Patent: Sep. 4, 2018

(54) AIRBAG INCLUDING HUB AND INFLATABLE FINS

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 15/259,353

(22) Filed: Sep. 8, 2016

(65) Prior Publication Data

US 2018/0065585 A1    Mar. 8, 2018

(51) Int. Cl.
  *B60R 21/214*  (2011.01)
  *B60R 21/231*  (2011.01)
  *B60R 21/2338* (2011.01)

(52) U.S. Cl.
  CPC .......... *B60R 21/214* (2013.01); *B60R 21/231* (2013.01); *B60R 21/2338* (2013.01); *B60R 2021/23161* (2013.01); *B60R 2021/23192* (2013.01); *B60R 2021/23386* (2013.01)

(58) Field of Classification Search
  CPC .............. B60R 21/214; B60R 2021/23161
  See application file for complete search history.

(56) References Cited

U.S. PATENT DOCUMENTS

| 3,747,952 | A | * | 7/1973 | Graebe | B60R 21/205 |
| | | | | | 137/67 |
| 3,843,150 | A | * | 10/1974 | Harada | B60R 21/231 |
| | | | | | 182/137 |
| 4,076,277 | A | | 2/1978 | Kuwakado et al. | |
| 5,470,103 | A | * | 11/1995 | Vaillancourt | B60R 21/214 |
| | | | | | 280/730.1 |
| 5,529,337 | A | * | 6/1996 | Takeda | B60R 21/233 |
| | | | | | 280/729 |
| 6,273,465 | B1 | * | 8/2001 | Cress | B60R 21/233 |
| | | | | | 280/748 |
| 6,722,691 | B1 | | 4/2004 | Haland et al. | |

(Continued)

FOREIGN PATENT DOCUMENTS

| DE | 10007343 A1 * | 8/2001 | ........... B60R 21/231 |
| GB | 2548692 A | 9/2017 | |

(Continued)

OTHER PUBLICATIONS

Thomas Wohllebe, Safety device for vehicle occupants, especially for motor vehicle, has airbag arrangement with additional rollover airbag for unfolding over large area beneath roof seat position(s), Aug. 23, 2001, EPO, DE 10 007 343 Al, English Abstract (Year: 2001).*

(Continued)

*Primary Examiner* — James A English
(74) *Attorney, Agent, or Firm* — Frank A. MacKenzie; Bejin Bieneman PLC (57) ABSTRACT

An airbag includes a hub defining an inflation chamber and inflatable fins. The inflatable fins are connected to the hub and spaced from each other around a circumference of the hub. The inflatable fins extend radially from the hub in the inflated position.

20 Claims, 10 Drawing Sheets

(56) References Cited

U.S. PATENT DOCUMENTS

| | | | |
|---|---|---|---|
| 7,594,675 B2* | 9/2009 | Bostrom | B60R 21/207 |
| | | | 280/728.2 |
| 7,926,840 B1 | 4/2011 | Choi | |
| 8,087,690 B2 | 1/2012 | Kim | |
| 8,328,228 B2 | 12/2012 | Lee et al. | |
| 9,296,359 B2* | 3/2016 | Pan | B60R 21/233 |
| 9,676,355 B2* | 6/2017 | Kruse | B60R 21/0136 |
| 9,845,067 B2* | 12/2017 | Morris | B60R 21/233 |
| 2002/0043791 A1* | 4/2002 | Barnes | B60R 21/233 |
| | | | 280/743.1 |
| 2014/0097601 A1* | 4/2014 | Fukawatase | B60R 21/231 |
| | | | 280/730.2 |
| 2017/0174170 A1* | 6/2017 | Aranzulla | B60R 21/231 |
| 2017/0225641 A1* | 8/2017 | Faruque | B60N 2/143 |
| 2017/0361802 A1* | 12/2017 | Farooq | B60N 2/01 |

FOREIGN PATENT DOCUMENTS

| | | |
|---|---|---|
| GB | 2550257 A | 11/2017 |
| JP | 3680484 B2 | 8/2005 |

OTHER PUBLICATIONS

Thomas Wohllebe, Safety device for vehicle occupants, especially for motor vehicle, has airbag arrangement with additional rollover airbag for unfolding over large area beneath roof seat position(s), Aug. 23, 2001, EPO, DE 10 007 343 Al, Machine Translation of Description (Year: 2001).*

Search Report from United Kingdom Intellectual Property Office dated Feb. 5, 2018 regarding GB Application No. 1713952.8 (3 pages).

* cited by examiner

AIRBAG INCLUDING HUB AND INFLATABLE FINS

BACKGROUND

A vehicle may include amenities that allow occupants to face one another during operation of the vehicle. For example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities.

DETAILED DESCRIPTION

With reference to the Figures, wherein like numerals indicate like parts throughout the several views, an occupant restraint system 12 for a vehicle 10 includes an airbag 14. The airbag 14 includes a hub 16 defining an inflation chamber 18, and inflatable fins 20 connected to the hub 16. The inflatable fins are spaced from each other around a circumference of the hub 16. When the airbag is in an inflated position, the inflatable fins 20 extend radially from the hub 16.

Figure 1:
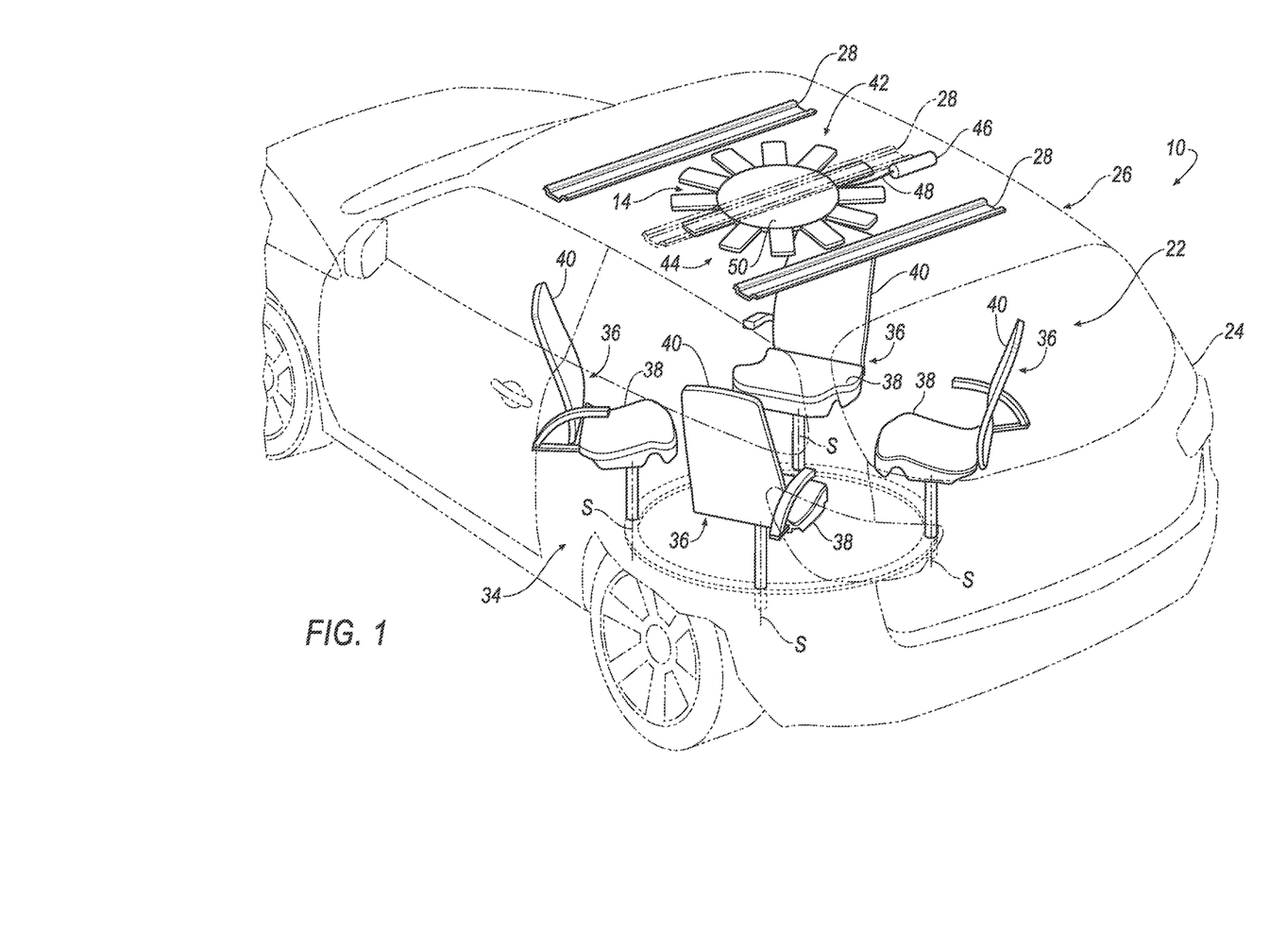
FIG. 1 is a perspective view of a vehicle including an occupant restraint system supported by a roof of the vehicle with an airbag in an uninflated position.
Figure 6:
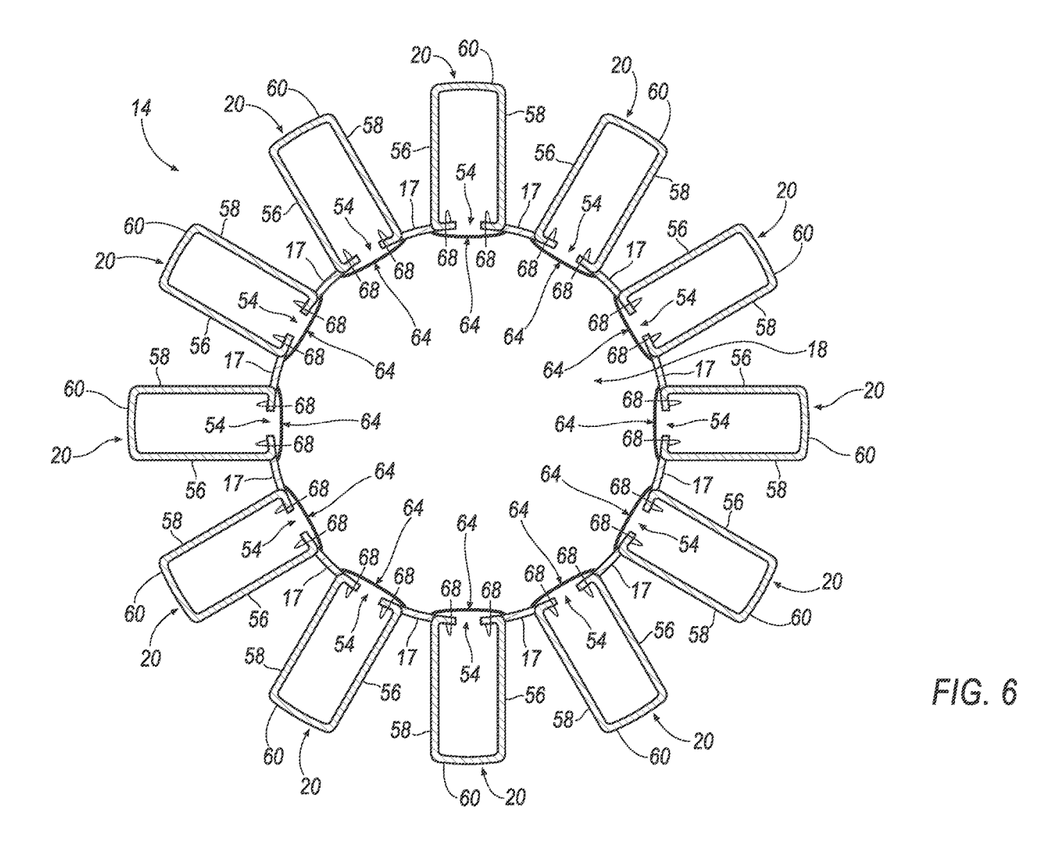
FIG. 6 is a cross-sectional view of the airbag of FIG. 4, with the tethers alternatively located.
Figure 7A:
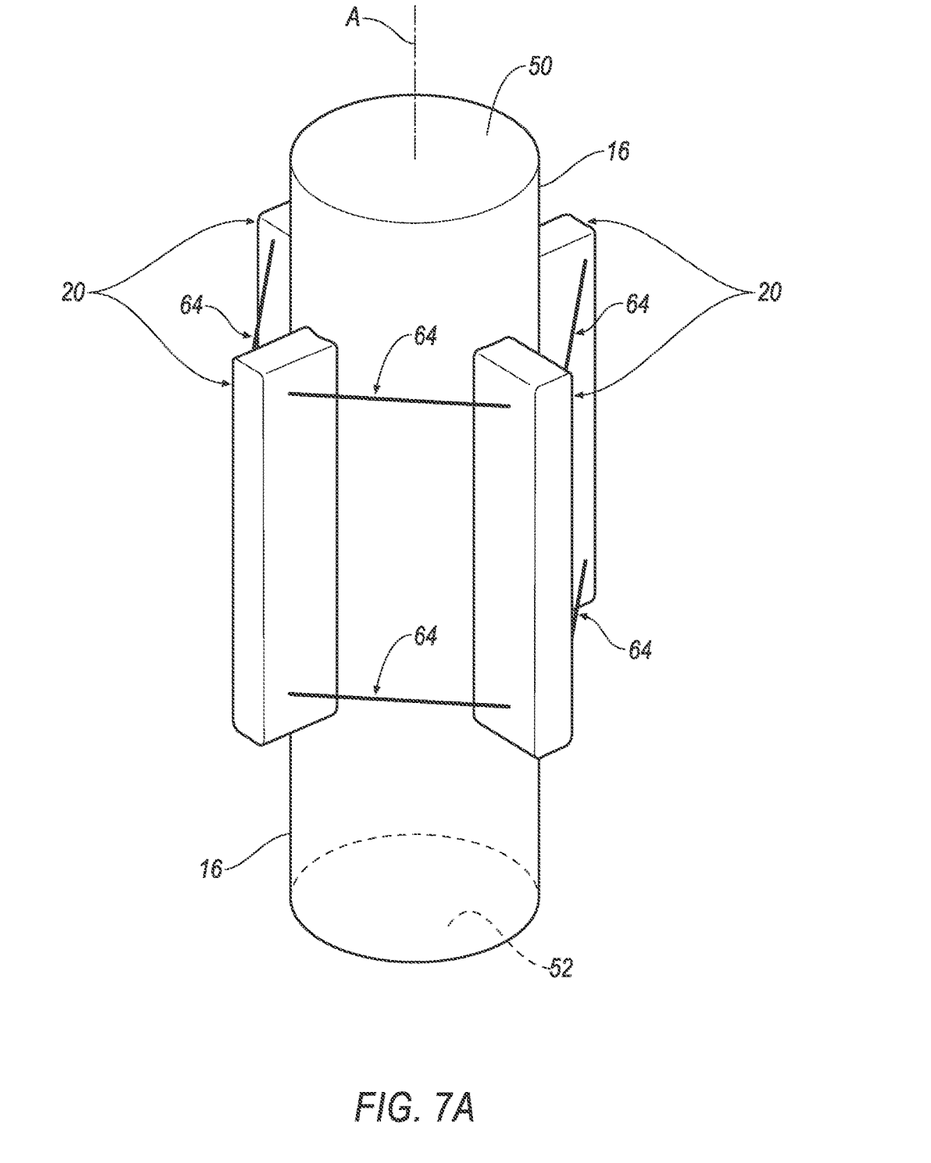
FIG. 7A is a perspective view of the airbag in an inflated position, with tethers located external to the airbag.
Figure 7B:
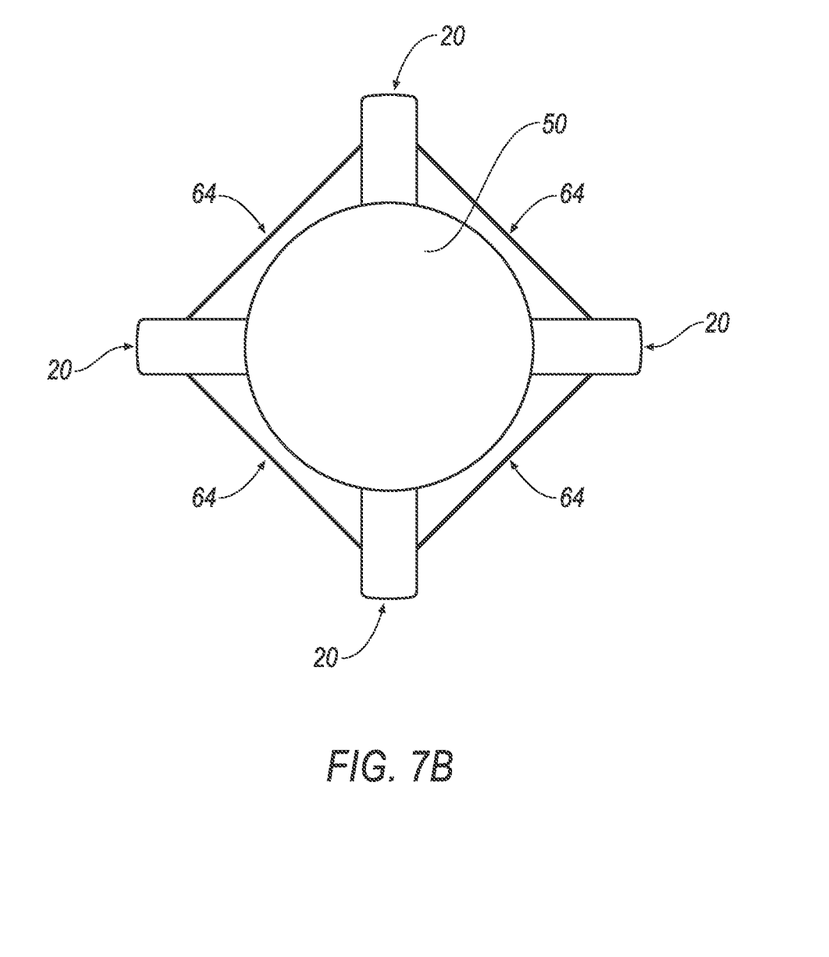
FIG. 7B is a top view of the airbag of FIG. 7A.
Figure 8:
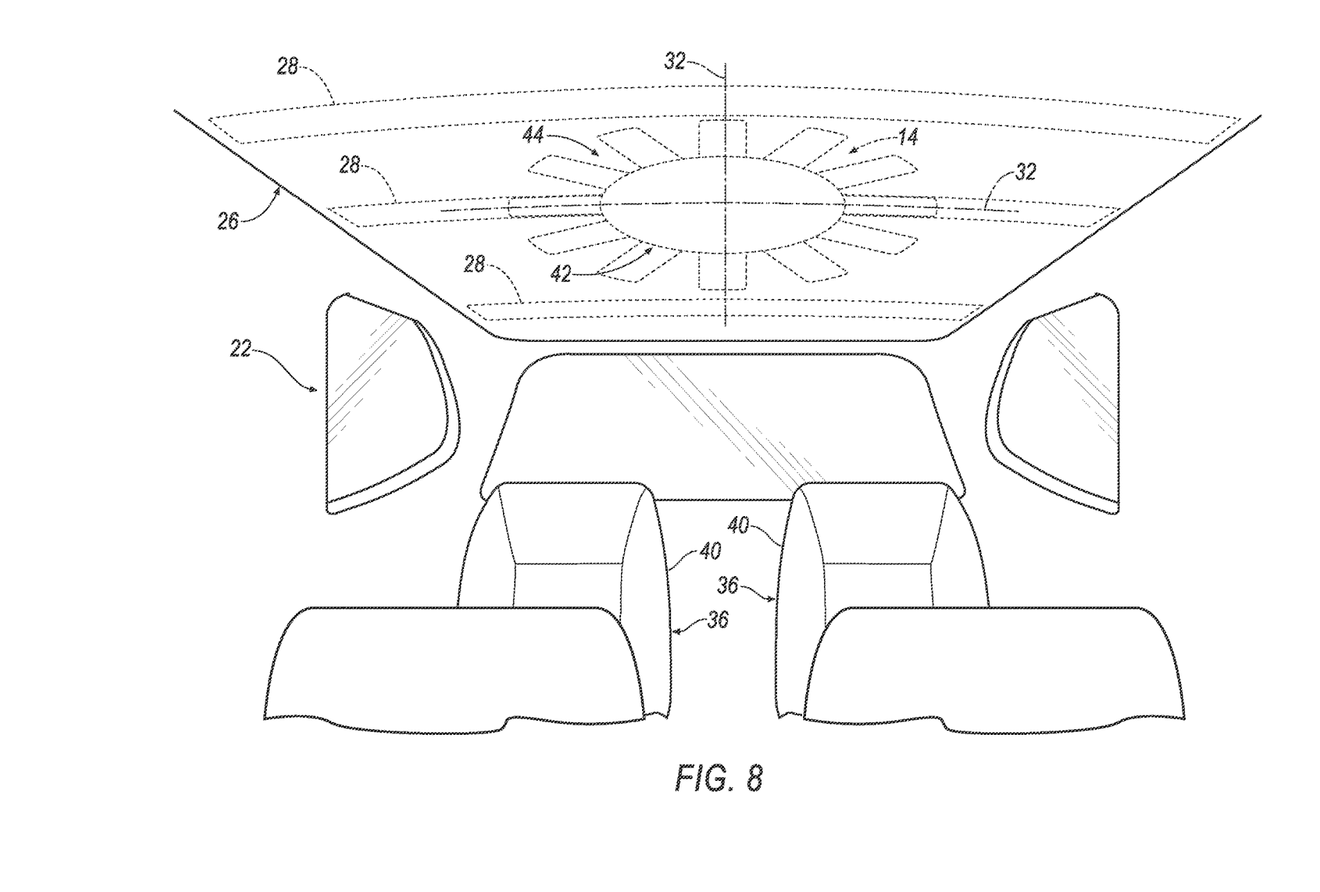
FIG. 8 is a perspective view of an interior of a vehicle including a headliner with a tear seam.

The airbag 14 is inflatable from an uninflated position, as shown in FIGS. 1 and 8, to the inflated position, as shown in FIGS. 2-7B. The airbag 14 may be deployed to the inflated position in response to an impact of the vehicle 10. In the inflated position, the airbag 14 may absorb energy from an occupant (not shown) during the impact to reduce the likelihood of the occupant impacting other occupants and/or components of an interior 22 of the vehicle 10.

For example, during an impact of the vehicle 10, the occupant may be urged into the airbag 14. A head, a torso, or other extremities (e.g., arms and legs) of the occupant may contact the airbag 14, which may absorb energy from the occupant. In addition, the head of the occupant may contact the hub 16 of the airbag 14 in a space, e.g., a pocket, between the inflatable fins 20. In this way, the inflatable fins 20 may retain the head of the occupant in the space between the inflatable fins 20. This may result in reducing forward movement of the head of the occupant, which may reduce head injury criteria (HIC), and reducing rotational movement of the head of the occupant, which may reduce brain injury criteria (BrIC).

The vehicle 10 may be an autonomous vehicle. In other words, the vehicle 10 may be autonomously operated such that the vehicle 10 may be driven without constant attention from a driver, i.e., the vehicle 10 may be self-driving without human input. During the operation of the autonomous vehicle, the occupants may face one another.

With reference to FIG. 1, the vehicle 10 includes a vehicle body 24 defining the interior 22 of the vehicle 10. The vehicle body 24 may include a roof 26, a floor 34, and a plurality of pillars (not numbered). The vehicle body 24 may have a unibody construction, a body-on-frame construction, or any other suitable construction. The vehicle body 24 may be formed of any suitable material, for example, steel, aluminum, etc.

The roof 26 may include a plurality of roof crossbeams 28, as shown in FIGS. 1-3 and 8. The pillars and/or any other component of the vehicle body 24 may support the roof crossbeams 28.

As shown in FIG. 8, a headliner 30 may be supported on the roof crossbeams 28. The headliner 30 may include a tear seam 32. The tear seam 32 can allow the airbag 14 to break through the headliner 30 toward the floor 34 when the airbag 14 deploys to the inflated position. The tear seam 32 may be adjacent to the airbag 14 when the airbag is in the uninflated position. The tear seam 32 may be, for example, in the shape of a line, a T, a cross shape, etc, or may match the shape of the airbag 14.

Figure 2:
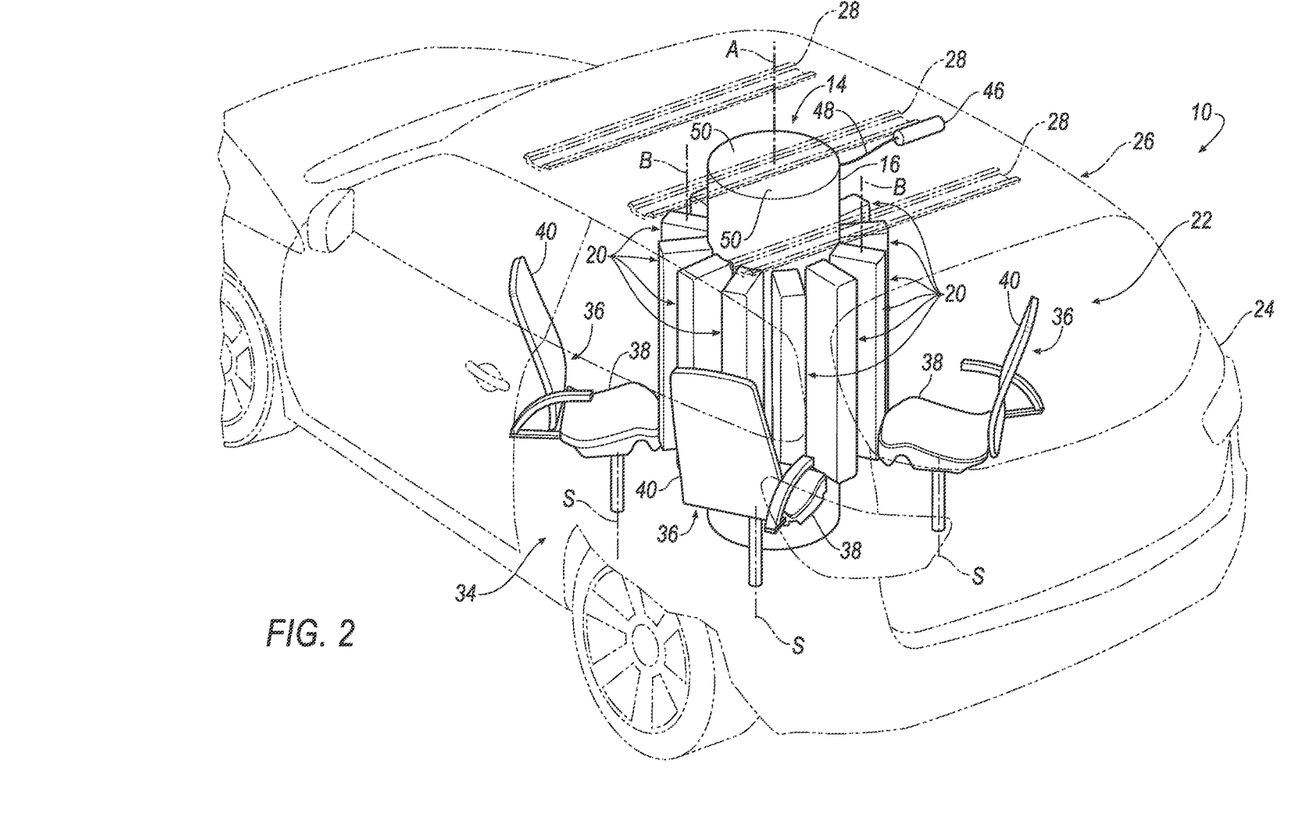
FIG. 2 is a perspective view of FIG. 1 with the airbag in an inflated position including a hub and inflatable fins connected to the hub.
Figure 3:
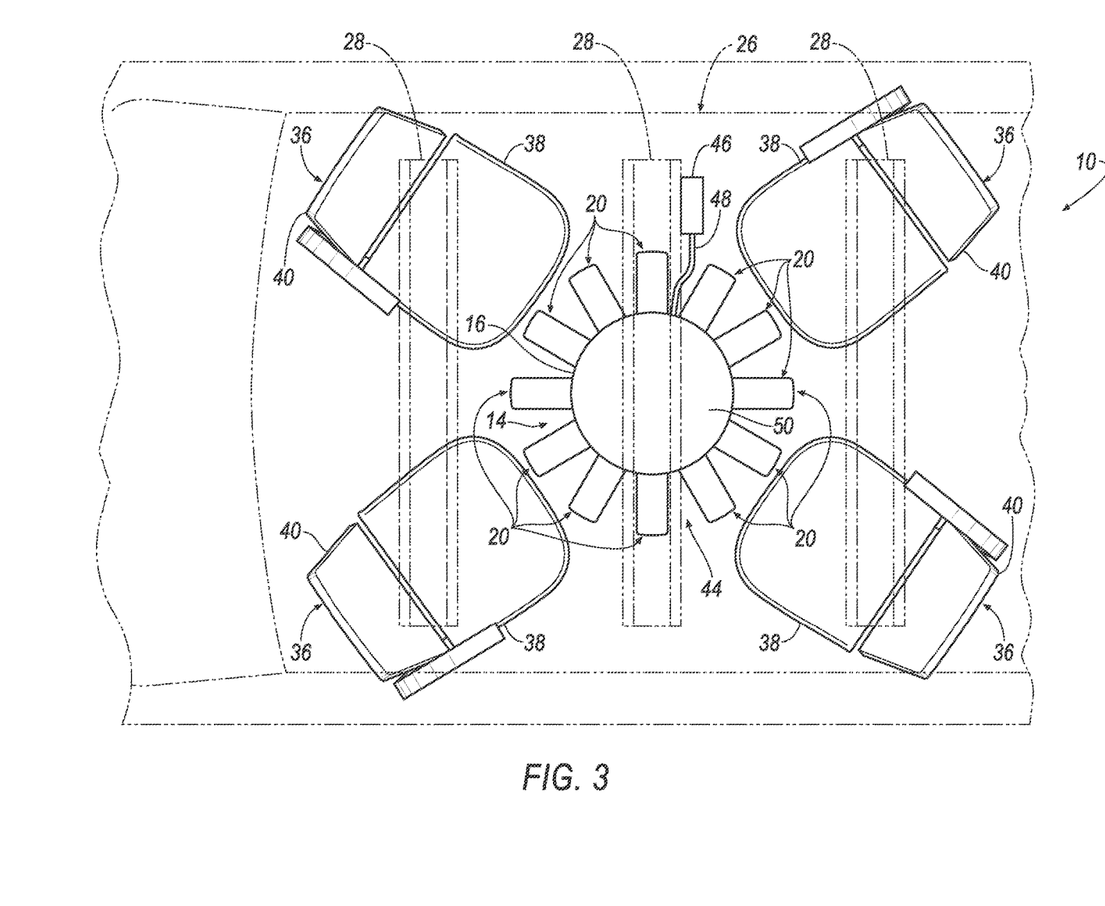
FIG. 3 is a top view of the vehicle including the airbag and seats.

As shown in FIGS. 1-3, the interior 22 of the vehicle 10 may include one or more seats 36. For example, the interior 22 of the vehicle 10 may include a plurality of seats 36 supported by the floor 34. The vehicle 10 may include any suitable number of seats 36, and the seats 36 may be arranged in any suitable way.

The seats 36 may, for example, be arranged such that when the airbag 14 is deployed to the inflated position, the airbag 14 is between the seats 36, as shown in FIGS. 2-3. As shown in FIGS. 1-3, the seats 36 may be arranged in a ring. Alternatively, the seats 36 may be arranged in a front row (not shown) and a rear row (not shown). Each of the seats 36 may be, for example, a bucket seat, a bench seat, a child seat, a booster seat, or any other suitable type of seat.

With reference to FIGS. 1 and 2, the seats 36 can include a seat bottom 38 and a seatback 40. The seatback 40 may extend upwardly from the seat bottom 38. In addition, the seatback 40 may recline relative to the seat bottom 38. A base (not numbered) may support the seat bottom 38 on the floor 34 of the vehicle 10.

The seats 36 may be mounted in a fixed position on the floor 34. As another example, the seats 36 may be moveable independently, or together as a unit, relative to the floor 34 of the vehicle 10, e.g., in a circular path around the ring, in a vehicle fore-and-aft direction, and/or in a cross-vehicle direction. In other words, the base of the seats 36 may be moveable relative to the floor 34 of the vehicle 10 in the vehicle fore-and-aft direction and/or in the cross-vehicle direction.

The seats 36 may be rotatable about a seat axis S. For example, the seats 36 may be rotatable to any selected position about the seat axis S, e.g., 180-360 degrees. As shown in FIG. 2, the seat axis S may be generally parallel to a longitudinal axis A of the hub 16 when the airbag 14 is deployed to the inflated position. With reference to FIGS.

1-3, the seats 36 may be independently rotatable to a position facing each other. In this position, when the airbag 14 is deployed to the inflated position, the likelihood of the occupants impacting one another may be reduced.

The airbag 14 may be part of an airbag assembly 42. The airbag assembly 42 may include an airbag base 44 that supports the airbag 14. For example, the airbag base 44 may house the airbag 14 when the airbag 14 is in the uninflated position. The airbag base 44 may provide a reaction surface when the airbag 14 is deployed to the inflated position. The airbag 14 may be attached to the airbag base 44 with clips, fasteners, adhesives, etc. The airbag base 44 can be of any suitable type, and may be formed from any suitable material, such as plastic, metal, composite, etc.

The roof 26 of the vehicle 10 may support the airbag assembly 42. For example, the airbag assembly 42 may be mounted to one or more of the crossbeams 28 of the roof 26, as shown in FIGS. 1-3. The airbag base 44 may include brackets (not shown) or the like for mounting the airbag assembly 42 to one or more of the roof crossbeams 28. The airbag assembly 42 may be disposed between the roof crossbeams 28 and the headliner 30 when the airbag 14 is in the inflated position, as shown in FIG. 8.

The airbag assembly 42 may include an inflator 46 in fluid communication with the airbag 14 that inflates the airbag 14 from the uninflated position to the inflated position. The inflator 46 expands the airbag 14 with an inflation medium, such as a gas, to move the airbag 14 from the uninflated position to the inflated position. Specifically, the inflator 46 may be in communication with the inflation chamber 18 to supply the inflation medium to the inflation chamber 18.

The inflator 46 may be supported by the roof 26, e.g., the inflator 46 may be disposed in the airbag base 44. Alternatively, the inflator may be mounted directly to the roof crossbeam 28, as shown in FIGS. 1-3, or disposed at any other suitable part of the vehicle body 24, e.g., at the pillars.

The inflator 46 may be, for example, a pyrotechnic inflator that uses a chemical reaction to drive the inflation medium into the airbag 14. Alternatively, the inflator 46 may be a cold-gas inflator that, when activated, ignites a pyrotechnic charge that creates an opening for releasing the pressurized inflation medium to the airbag 14 via a fill tube 48. Alternatively, the inflator 46 may be of any suitable type, for example, a hybrid inflator.

Figure 4:
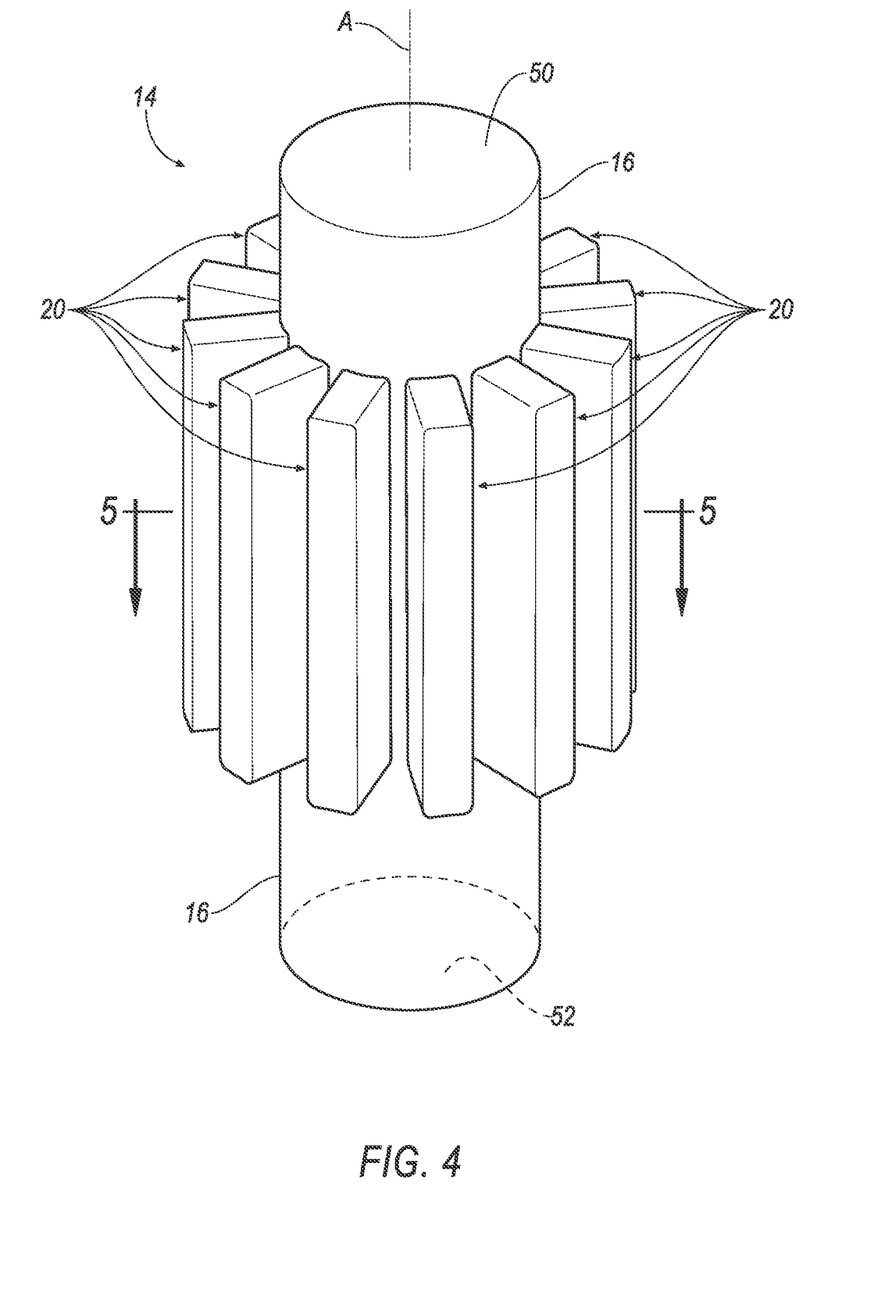
FIG. 4 is a perspective view of the airbag in the inflated position.

As discussed above, the airbag 14 is deployable from the uninflated position, as show in FIGS. 1 and 8, to the inflated position, as shown in FIGS. 2-7B. In the inflated position, the hub 16 of the airbag 14 may have a top 50, as shown in FIGS. 2, 4, and 7A. The top 50 of the hub 16 may be adjacent the roof 26 of the vehicle 10. The hub 16 may also include a bottom 52 adjacent the floor 34 of the vehicle 10. The hub 16 of the airbag 14 may define the inflation chamber 18.

As shown in FIGS. 2, 4, and 7A and as discussed above, when the airbag 14 is deployed to the inflated position, the hub 16 may be elongated along the longitudinal axis A. In the inflated position, the hub 16 may have any suitable shape, e.g., a cylindrical shape. The hub 16 may be formed from a single piece of material. Alternatively, the hub 16 may be formed from multiple pieces of material.

Figure 5:
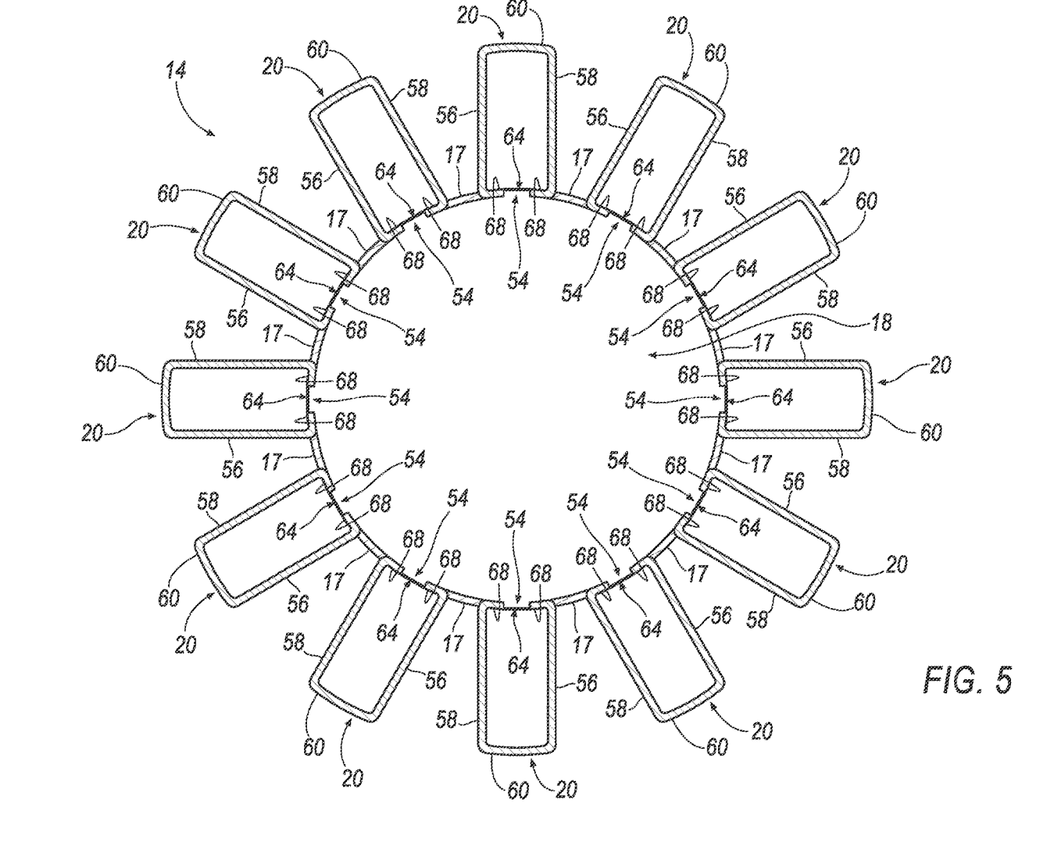
FIG. 5 is a cross-sectional view of the airbag of FIG. 4, including tethers located in inflatable fins.

As set forth above, the inflatable fins 20 are spaced from each other about the circumference of the hub 16. For example, the hub 16 may include a plurality of panels 17 extending between adjacent inflatable fins 20, i.e., from one inflatable fin 20 to an adjacent inflatable fin 20, as shown in FIGS. 5 and 6. When the airbag 14 is in the inflated position, the panels 17 may be arranged in a cylindrical pattern.

The panels 17 may be part of a single piece of material. As another example, the plurality of panels 17 may be attached together in any suitable manner, e.g., stitched. When the hub 16 includes the plurality of panels 17 that are attached together, or formed from a single piece of material, openings 54 may be in the panels 17 (or in the single piece of material) in a location where the inflatable fins 20 are connected to the hub 16. The openings 54 may extend between the inflation chamber 18 and the inflatable fins 20.

As another example, the plurality of panels 17 may be spaced from each other around a circumference of the hub 16, with the panels 17 defining openings 54 between adjacent panels 17. A first side 56 of one inflatable fin 20 can be connected to one panel 17, and a second side 58 of the inflatable fin 20 opposing the first side 56 can be connected to an adjacent panel 17. The inflatable fin 20 may extend across the opening 54 between the adjacent panels 17. Each of the openings 54 may include an inflatable fin 20 connected to adjacent panels 17, with the openings 54 defined by the adjacent panels 17 extending between the inflation chamber and the inflatable fins 20.

Each inflatable fin 20 may include a back end 60, a top end 62, and a bottom end (not shown). As shown in FIGS. 5, 6, and 7B, in the inflated position, the inflatable fins 20 may have a length L and a width W, with the length L greater than the width W. The inflatable fins 20 may be formed from a single piece of material. Alternatively, the inflatable fins 20 may be formed from multiple pieces of material.

As discussed above, the inflatable fins 20 may be connected to the hub 16. For example, the first side 56 of an inflatable fin 20 may be connected to the hub 16 on one side of an opening 54 in the hub 16, and the second side 58 of the inflatable fin 20 may be connected to the hub 16 on an opposing side of the opening 54. In this way, the inflatable fins 20 may be in fluid communication with the inflation chamber 18. The inflatable fins 20 can be connected to the hub 16 in any suitable manner, e.g., stitching, adhesives, chemical welding, staples, and the like.

As shown in FIGS. 2-7B, the inflatable fins 20 may be spaced from each other around the circumference of the hub 16. For example, the inflatable fins 20 may be spaced equidistantly from each other around the hub 16. When the airbag 14 is in the inflated position, the inflatable fins 20 may extend radially from the hub 16. The inflatable fins 20 may, for example, extend radially in a direction away from the inflation chamber 18.

As discussed above, the inflatable fins 20 may be in fluid communication with the inflation chamber 18. For example, the openings 54 may extend between the inflation chamber 18 defined by the hub 16, and the inflatable fins 20. As such, as the inflator 46 drives the inflation medium into the inflation chamber 18, the inflation medium may pass through the openings 54 in the hub 16 to the inflatable fins 20. The hub 16 and the inflatable fins 20 may expand, e.g., elongate, as the inflator 46 drives the inflation medium into the inflation chamber 18.

Alternatively, the inflatable fins 20 may be inflated independently of the inflation chamber 18. For example, the inflator 46 may be in communication with the inflatable fins 20 to supply the inflation medium to the inflatable fins 20.

In the inflated position, the inflatable fins 20 may be elongated along a longitudinal axis B in parallel with the longitudinal axis A of the hub 16, as shown in FIG. 2. The inflatable fins 20 may extend along the longitudinal axis B. The inflatable fins 20 may extend between the top 50 and the bottom 52 of the hub 16. Alternatively, the inflatable fins 20 may extend from the top 50 to the bottom 52 of the hub 16.

The airbag 14, including the hub 16 and the inflatable fins 20, may be formed of any suitable airbag material, such as a woven polymer. For example, the airbag 14 may be formed of woven nylon yarn, such as nylon 6-6. Other suitable materials include polyether ether ketone (PEEK), polyetherketoneketone (PEKK), polyester, and/or any other suitable polymer. The woven polymer may include a coating, such as silicone, neoprene, urethane, and so on. For example, the coating may be polyorgano siloxane. The airbag 14, including the hub 16 and the inflatable fins 20, may all be formed of the same material, or may be formed of different materials.

The airbag 14 may include tethers 64. The tethers 64 may include a first end 66 and a second end 68. As shown in FIG. 5, first end 66 of the tether 64 may be attached to the first side 56 of the inflatable fin 20, and the second end 68 of the tether 64 may be attached to the second side 58 of the inflatable fin 20 about an opening 54 in the hub 16 of the airbag 14. Each of the inflatable fins 20 may include at least one tether 64 as shown in FIG. 5. In addition, each of the inflatable fins 20 may include multiple tethers 64 spaced along the longitudinal axis B of the inflatable fin 20.

Additionally or alternatively, the airbag 14 can include tethers 64 as shown in FIG. 6. Specifically, the first end 66 of the tether 64 is attached to the hub 16 on one side of an opening 54, and the second end 68 of the tether 64 is attached to hub 16 across the opening 54. Each of the openings 54 in the hub 16 may include at least one tether 64. In addition, each of the openings 54 may include multiple tethers 64 spaced along a length of the opening 54.

With reference to FIGS. 7A and 7B, the airbag 14 may include tethers 64 external to the airbag 14. For example, one or more of the tethers 64 may attach adjacent inflatable fins 20 to each other.

Figure 9:
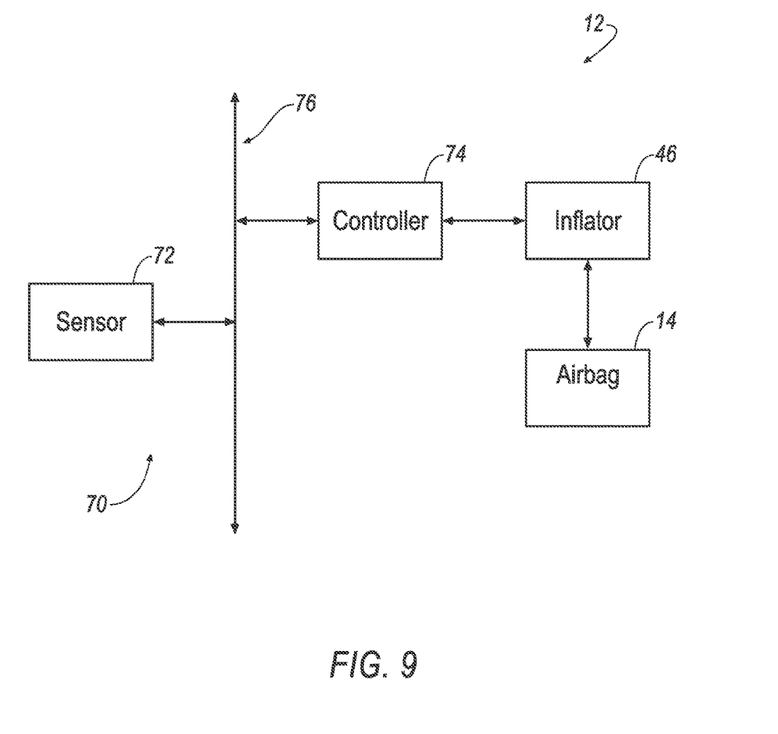
FIG. 9 is a schematic of the occupant restraint system of the vehicle.

A schematic of the occupant restraint system 12 is shown in FIG. 9. The occupant restraint system 12 can include an impact sensing system 70. The impact sensing system 70 may include at least one sensor 72. The sensor 72 is adapted to detect an impact to the vehicle 10. The impact sensor may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The sensor 72 may be located at numerous points in or on the vehicle 10. for sensing, e.g., an impact of the vehicle 10. The sensor 72 is the only component of the impact sensing system 70 shown in FIG. 9. It should be appreciated, however, that the impact sensing system 70 may include additional components not shown in FIG. 9.

The occupant restraint system 12 may include a controller 74. The controller 74 and the sensor 72 may be connected to a communication bus 76, such as a controller area network (CAN) bus, of the vehicle 10. The controller 74 may use information from the communication bus 76 to control the activation of the inflator 46. The inflator 46 may be connected to the controller 74, as shown in FIG. 9, or may be connected directly to the communication bus 76.

The controller 74 may be in communication with the sensor 72 and the inflator 46, directly or through the communication bus 76, for activating the inflator 48, e.g., for providing an impulse to a pyrotechnic charge of the inflator 48, when the sensor 72 senses an impact of the vehicle 10. Alternatively or additionally to sensing impact, the impact sensing system 70 may be configured to sense impact prior to impact, i.e., pre-impact sensing. The sensor 72 may be of any suitable type, e.g., using radar, lidar, and/or a vision system. The vision system may include one or more cameras, CCD image sensor, and/or CMOS image sensor, etc.

The controller 74 may be a microprocessor-based controller. The sensor 72 is in communication with the controller 74 to communicate data to the controller 74. Based on the data communicated by the sensor 72, the controller 74 may instruct the inflator 46 to activate.

In operation, the airbag 14 is in an uninflated position, as shown in FIGS. 1 and 8, under normal operating conditions of the vehicle 10. When the sensor 72 senses an impact of the vehicle 10, the impact sensing system 70 triggers communication to the controller 74 identifying the impact. In response, the controller 74 may instruct the inflator 46 to inflate the airbag 14 with the inflation medium, deploying the airbag 14 from the uninflated position to the inflated position. As the airbag 14 inflates to the inflated position, the airbag 14 may displace the headliner 30 to extend downwardly from a reaction surface, such as the airbag base 44, or any like surface to which the airbag 14 can be mounted.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. An airbag comprising:
   a hub defining an inflation chamber and being inflatable to an inflated position; and
   inflatable fins connected to the hub and spaced from each other around a circumference of the hub;
   each of the inflatable fins extending radially from the hub in the inflated position;
   the hub is elongated along a longitudinal axis and each inflatable fin is elongated along an axis in parallel with the longitudinal axis; and
   the hub includes a top and a bottom spaced from each other along the longitudinal axis, and the inflatable fins are spaced from the top and the bottom.

2. The airbag of claim 1, wherein the hub includes panels spaced from each other around the circumference of the hub in alternating arrangement with the inflatable fins.

3. The airbag of claim 2, wherein the panels are arranged in a cylindrical pattern in the inflated position.

4. The airbag of claim 1, wherein the inflatable fins extend away from the inflation chamber in the inflated position.

5. The airbag of claim 1, wherein the inflatable fins are in fluid communication with the inflation chamber.

6. The airbag of claim 1, wherein the hub includes openings extending between the inflation chamber and the inflatable fins.

7. The airbag of claim 6, wherein each inflatable fin includes a first side and a second side opposing the first side about the opening, and a tether attached to the first side and to the second side.

8. The airbag of claim 6, further comprising a tether having a first end connected to the hub and a second end connected to the hub and extending across the opening.

9. The airbag of claim 1, wherein each inflatable fin is spaced equidistantly from adjacent inflatable fins.

10. The airbag of claim 1, wherein a first tether is attached to a first inflatable fin and a second inflatable fin external to the inflation chamber, a second tether is attached to the second inflatable fin and a third inflatable fin external to the inflation chamber, a third tether is attached to the third inflatable fin and a fourth inflatable fin external to the inflation chamber, and a fourth tether is attached to the fourth inflatable fin and the first inflatable fin external to the inflation chamber.

11. The airbag of claim 1, wherein the hub is cylindrical.

12. An occupant restraint system comprising:
a roof;
an airbag supported by the roof, the airbag including a hub defining an inflation chamber and being inflatable to an inflated position, the hub in the inflated position being cylindrical having a top and a bottom and being elongated along a longitudinal axis that extends through the top, the bottom, and the roof; and
inflatable fins connected to the hub and spaced from each other around a circumference of the hub;
each of the inflatable fins in the inflated position extending radially from the hub and being elongated along an axis in parallel with the longitudinal axis.

13. The occupant restraint system of claim 12, wherein the hub includes panels spaced from each other around the circumference of the hub in alternating arrangement with the inflatable fins.

14. The occupant restraint system of claim 13, wherein the panels are arranged in a cylindrical pattern in the inflated position.

15. The occupant restraint system of claim 12, wherein the inflatable fins extend away from the inflation chamber in the inflated position.

16. The occupant restraint system of claim 12, wherein the inflatable fins are in fluid communication with the inflation chamber.

17. The occupant restraint system of claim 16, wherein the hub includes openings extending between the inflation chamber and each of the inflatable fins.

18. The occupant restraint system of claim 12, wherein a first tether is attached to a first inflatable fin and a second inflatable fin external to the inflation chamber, a second tether is attached to the second inflatable fin and a third inflatable fin external to the inflation chamber, a third tether is attached to the third inflatable fin and a fourth inflatable fin external to the inflation chamber, and a fourth tether is attached to the fourth inflatable fin and the first inflatable fin external to the inflation chamber.

19. The occupant restraint system of claim 12, wherein the longitudinal axis is perpendicular to the roof.

20. An airbag comprising:
a hub defining an inflation chamber and being inflatable to an inflated position;
inflatable fins connected to the hub and spaced from each other around a circumference of the hub;
each of the inflatable fins extending radially from the hub in the inflated position;
the hub includes openings extending between the inflation chamber and the inflatable fins; and
a tether having a first end connected to the hub and a second end connected to the hub and extending across the opening.

* * * * *